United States Patent
Qiang et al.

(10) Patent No.: US 10,089,423 B2
(45) Date of Patent: Oct. 2, 2018

(54) SYSTEMS AND METHODS FOR EFFICIENTLY SIMULATING WAVE PROPAGATION IN VISCOELASTIC MEDIA

(71) Applicant: MAYO FOUNDATION FOR MEDICAL EDUCATION AND RESEARCH, Rochester, MN (US)

(72) Inventors: BO Qiang, Rochester, MN (US); Matthew W Urban, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 303 days.

(21) Appl. No.: 15/161,440

(22) Filed: May 23, 2016

(65) Prior Publication Data
US 2016/0342717 A1 Nov. 24, 2016

Related U.S. Application Data

(60) Provisional application No. 62/164,958, filed on May 21, 2015.

(51) Int. Cl.
*G06F 7/60* (2006.01)
*G06F 17/10* (2006.01)
*G06F 17/50* (2006.01)

(52) U.S. Cl.
CPC ............................... *G06F 17/5009* (2013.01)

(58) Field of Classification Search
CPC .................................................. G06F 17/5009
USPC ............................................................. 703/2
See application file for complete search history.

(56) References Cited

U.S. PATENT DOCUMENTS

| | | | | |
|---|---|---|---|---|
| 2006/0241921 A1* | 10/2006 | Willis | ................ | G06F 17/5036 703/2 |
| 2013/0018640 A1* | 1/2013 | Etgen | ....................... | G01V 1/30 703/2 |
| 2014/0365188 A1* | 12/2014 | Doerr | .................. | G06F 17/5009 703/2 |
| 2015/0148675 A1* | 5/2015 | Haupt | .................... | A61B 8/488 600/438 |
| 2016/0320353 A1* | 11/2016 | Biwa | ...................... | G01N 29/46 |

* cited by examiner

*Primary Examiner* — Timothy A Mudrick
(74) *Attorney, Agent, or Firm* — Quarles & Brady LLP

(57) ABSTRACT

Described here are systems and methods for efficiently simulating wave propagation in one or more viscoelastic media. The systems and methods described here implement an elastodynamic model that includes memory variables for one or more viscoelastic properties. Boundary conditions can also be generated based on a perfectly matched layer (PML) condition. A hybrid implicit/explicit method is used to generate wave simulation data. In this method, equations related to the memory variables and PML are solved using an implicit integrator, and other equations in the elastodynamic model are solved using an explicit method.

16 Claims, 3 Drawing Sheets

SYSTEMS AND METHODS FOR EFFICIENTLY SIMULATING WAVE PROPAGATION IN VISCOELASTIC MEDIA

CROSS-REFERENCE TO RELATED APPLICATIONS

This application claims the benefit of U.S. Provisional Patent Application Ser. No. 62/164,958, filed on May 21, 2015, and entitled "Efficient Computational Engine for Simulating Viscoelastic Wave Propagation."

STATEMENT REGARDING FEDERALLY SPONSORED RESEARCH

This invention was made with government support under DK092255 awarded by the National Institutes of Health. The government has certain rights in the invention.

BACKGROUND OF THE INVENTION

Simulating wave propagation in viscoelastic media has practical applications in many fields, including ultrasound elastography (e.g., shearwave dispersion unitrasound vibrometry ("SDUV")), magnetic resonance elastography ("MRE"), geophysics, and applied mechanics. As it relates to ultrasound elastography, simulating wave propagation in viscoelastic media can be useful for designing ultrasound probes, designing tissue mimicking phantoms, and for testing the accuracy of data processing methods.

Wave propagation methods are often computationally expensive; thus, there is a need for providing an efficient solver for simulating viscoelastic wave propagation.

SUMMARY OF THE INVENTION

The present invention overcomes the aforementioned drawbacks by providing a viscoelastic wave propagation simulation system that includes an input, an elastodynamic model generation unit, a spatial derivative computation unit, a boundary condition generation unit, and a wave simulation unit. The input receives viscoelastic property data for a viscoelastic medium, and the elastodynamic model generation unit initializes an elastodynamic model for the viscoelastic medium based at least in part on the viscoelastic property data received by the input. The initialized elastodynamic model includes memory variables for at least some of the viscoelastic property data. The spatial derivative computation unit computes spatial derivatives in the initialized elastodynamic model, and the boundary condition generation unit generates boundary conditions for the initialized elastodynamic model. The wave simulation unit is in communication with the elastodynamic model generation unit, the spatial derivative computation unit, and the boundary condition generation unit, and generates wave simulation data using a hybrid implicit and explicit method in which equations in the initialized elastodynamic model related to the memory variables and boundary conditions are integrated using an implicit method and other equations in the initialized elastodynamic model are integrated using an explicit method.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Described here are systems and methods for simulating wave propagation in viscoelastic media. In these systems and method, an elastodynamic equation is formulated as a velocity-stress relationship. Material viscosity is introduced as memory variables for representing viscous stress rates. Boundary conditions can be can be configured at the borders of the computational domain to minimize reflections. As one example, the boundary conditions can include so-called "perfectly matched layer" ("PML") boundary conditions, such as convolutional PML ("CPML") boundary conditions. The spatial domain is discretized, for example using a mapped Chebyshev method. Spatial derivatives can be estimated by a Chebyshev pseudospectral method. The systems and methods use a mixed explicit/implicit method to integrate over time.

A number of common material types are supported by the systems and methods described here. Example material types include isotropic viscoelastic/elastic materials and transversely isotropic elastic/viscoelastic materials. To simulate more general material properties, the stiffness matrix and its viscoelastic properties can be specified directly.

The systems and methods described here can be optimized for simulating the shear wave propagation induced by ultrasound radiation push in soft tissues. Compared to finite difference and finite element methods, the systems and methods described here require a smaller number of points per wavelength; therefore, the systems and methods have a faster convergence speed. A smaller problem size can also benefit the computational efficiency for nearly incompressible media, which is computationally expensive.

The partial differential equations related to viscous variables and CPML can be integrated with a modified Crank-Nicolson implicit method for its unconditional stability. For the rest of the equations, the stability of the systems and methods can be improved by a predictor-corrector method. An adaptive step size strategy can also be used to march in time more efficiently while maintaining stability and accuracy.

Figure 1:
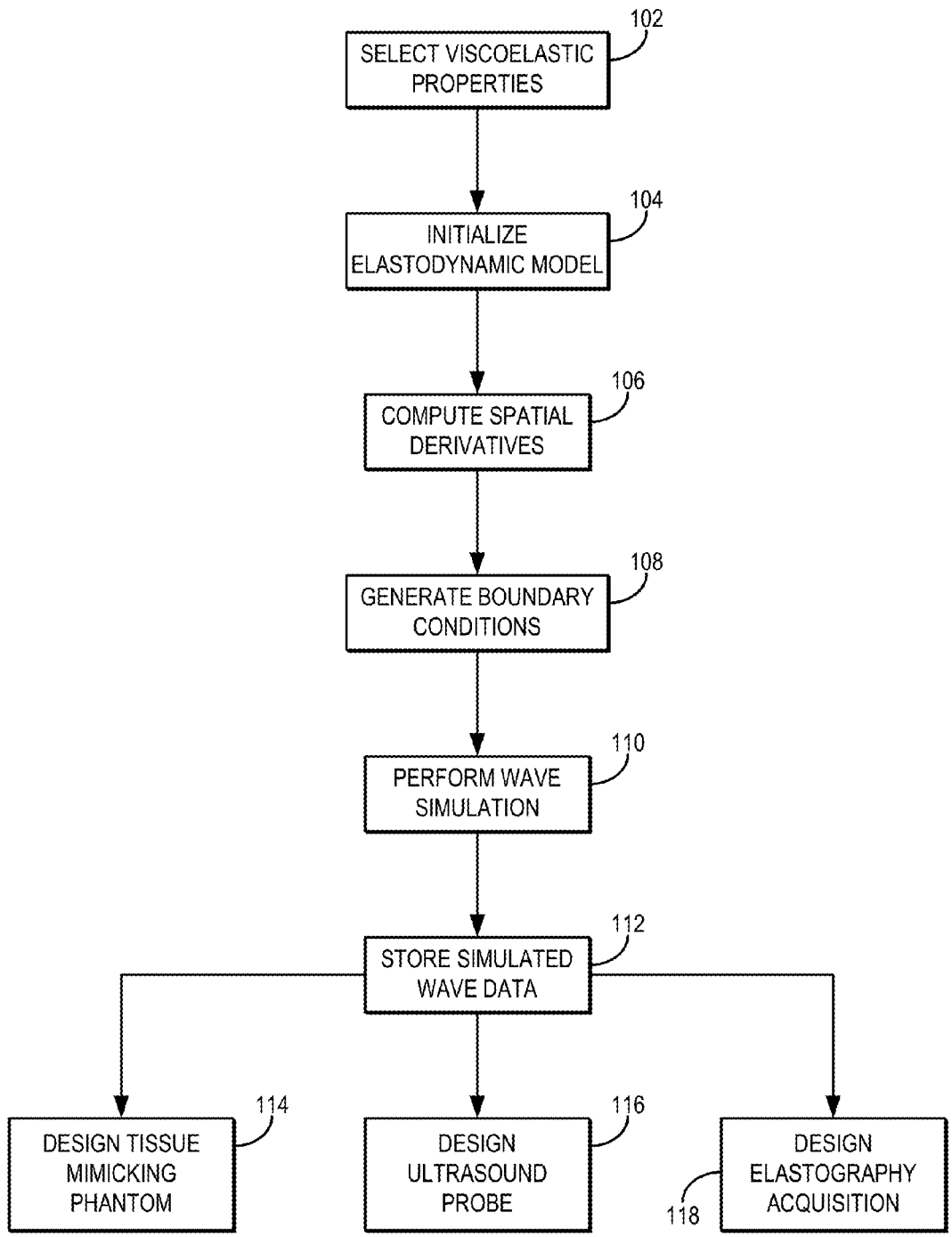
FIG. 1 is a flowchart setting forth the steps of an example method for simulating wave propagation in one or more viscoelastic media.

Referring now to FIG. 1, a flowchart is illustrated as setting forth the steps of an example method for simulating wave propagation in viscoelastic media. This method can be implemented using a computer system, such as the viscoelastic wave propagation simulation system described below with respect to FIG. 3.

The method includes selecting viscoelastic properties for a medium or media, as indicated at step 102. The viscoelastic properties can include, but are not limited to, viscosity, strain relaxation time constant, stress relaxation time constant, and stiffness tensor values for one or more viscoelastic media. As one example, when the wave propagation simulation is being performed to design or otherwise evaluate a tissue mimicking phantom, the viscoelastic properties of the media used, or to be used, in the construction of the phantom can be provided to the computer system or viscoelastic wave propagation simulation system.

An elastodynamic model to be used in the simulation is initialized by the computer system, as indicated at step 104. Initializing the model can include selecting the equations on which the model will be based. As one example, the model can be based on second order elastodynamic equation. In matrix notations, the second order elastodynamic equation in solids can be written as, $$\rho \frac{\partial^2 u}{\partial t^2} = \nabla \cdot (C \cdot (\nabla^T \cdot u)) + f; \qquad (1)$$

where $u$ is the particle displacement vector, $f$ is the body force vector, and $C$ is the 6×6 stiffness matrix. The operator $\nabla$ is a symmetric gradient operator that has the following representation, $$\nabla = \begin{pmatrix} \partial_x & 0 & 0 & 0 & \partial_z & \partial_y \\ 0 & \partial_y & 0 & \partial_z & 0 & \partial_x \\ 0 & 0 & \partial_z & \partial_y & \partial_x & 0 \end{pmatrix}; \qquad (2)$$

and $\nabla^T$ is the matrix transpose of $\nabla$. Using the velocity-stress formulation, Eqn. (1) can be expressed as, $$\frac{\partial v_i}{\partial t} = \frac{1}{\rho}\left(\sum_{j=1}^{3} \frac{\partial \sigma_{ij}}{\partial x_j} + f_i\right), \text{ for } i = 1, 2, 3; \qquad (3)$$

$$\frac{\partial \sigma_{ii}}{\partial t} = \sum_{j=1}^{3} c^{iijj} \frac{\partial v_j}{\partial x_j}, \text{ for } i = 1, 2, 3; \qquad (4)$$

$$\frac{\partial \sigma_{ij}}{\partial t} = c^{ijij}\left(\frac{\partial v_i}{\partial x_j} + \frac{\partial v_j}{\partial x_i}\right), \text{ for } i \neq j = 1, 2, 3; \qquad (5)$$

where $c$ is an element of the stiffness matrix, $C$. The selected viscoelastic properties (e.g., viscosity) can be introduced into the elastodynamic model by memory variables $e_{ij}$. Using these memory variables, Eqns. (4) and (5) can be expressed as, $$\frac{\partial \sigma_{ii}}{\partial t} = \sum_{j=1}^{3}\left(c_u^{iijj}\frac{\partial v_j}{\partial x_j} + e_{iijj}\right), \text{ for } i = 1, 2, 3; \qquad (6)$$

$$\frac{\partial \sigma_{ij}}{\partial t} = c_u^{ijij}\left(\frac{\partial v_i}{\partial x_j} + \frac{\partial v_j}{\partial x_i}\right) + e_{ijij}, \text{ for } i \neq j = 1, 2, 3; \qquad (7)$$

where $c_u^{ijkl}$ are the unrelaxed stiffness tensors. Additional equations related to the memory variables, $e_{ij}$, can be included as, $$\frac{\partial e_{iijj}}{\partial t} = -\frac{1}{\tau_{iijj}}\left[\left(1 - \frac{\tau_\varepsilon^{iijj}}{\tau_\sigma^{iijj}}\right)\frac{\partial v_i}{\partial x_i} + e_{iijj}\right]; \qquad (8)$$

$$\frac{\partial e_{ijij}}{\partial t} = -\frac{1}{\tau_{ijij}}\left[\left(1 - \frac{\tau_\varepsilon^{ijij}}{\tau_\sigma^{ijij}}\right)\left(\frac{\partial v_i}{\partial x_j} + \frac{\partial v_j}{\partial x_i}\right) + e_{ijij}\right]; \qquad (9)$$

where $\tau_\varepsilon^{ijkl}$ and $\tau_\sigma^{ijkl}$ are the strain and stress relaxation time constants of the viscoelastic media. The parameters, $c_u^{ijkl}$ are related to the relaxed stiffness tensors, $c_r^{ijkl}$ by, $$c_u^{ijkl} = \frac{\tau_\varepsilon^{ijkl}}{\tau_\sigma^{ijkl}} c_r^{ijkl}. \qquad (10)$$

Spatial derivatives in the selected model are computed by the computer system, as indicated at step 106. As an example, one or more spatial derivatives can be computed based on a mesh grid that is selected over a field-of-view in which wave propagation is to be simulated. For instance, the field-of-view can span the range of [−1, +1] meters in one, two, or three dimensions. This range can be scaled as desired to fields-of-view covering other spatial extents, and can be scaled symmetrically in one, two, or three spatial dimensions, or can be scaled asymmetrically (e.g., for three-dimensional modeling, the spatial extent can be scaled to be greater along one dimension than the other two dimensions).

The mesh grid can then be remapped, such that the grid points are more dense in certain areas in the field-of-view and less dense in others. As one example, the mesh grid can be remapped to decrease the density of the grid points at the boundary of the field-of-view. As another example, the mesh grid can be remapped to increase the density of the grid points in the center of the field-of-view. When simulating shear wave propagation for ultrasound elastography applications, the mesh grid can also be remapped to increase the density of the mesh grid points at locations in the field-of-view to which ultrasound push pulses may be applied. In one specific example, the mesh grid can be remapped based on Eqn. (12) below.

As a specific non-limiting example, the spatial derivatives can be performed using a Chebyshev spectral method, such as those described by A. Alexandrescu, et al., in "Mapped Chebyshev pseudospectral method for the study of multiple scale phenomena," *Computer Physics Communications*, 2009; 180:912-919. In this example, a function, $H(s_i)$, defined in the domain of [−1, +1] meters is sampled by collocation points in a Gauss-Lobatto space, $$s_i = \cos\left(\frac{\pi i}{N}\right), \text{ for } i = 0, 1, \cdots, N. \qquad (11)$$

To find the derivative of $H(s_i)$, the points can be transformed to the Fourier domain (e.g., by using a fast Fourier transform ("FFT") routine). A recursive rule can be applied to the transformed points, such as described by J. P. Boyd in *Chebyshev and Fourier Spectral Methods*, 2nd ed. Mineola, N.Y.: Dover Publications, 2001. Then, an inverse Fourier transform can be applied to obtain the derivative. If $H(s_i)$ is defined in an arbitrary domain instead of [−1, +1] meters, then rescaling and shifting can be applied.

One disadvantage of the Chebyshev method is that the mesh density is fine near the boundaries and coarse in the middle. For wave propagation problems, it is usually not useful to have very fine mesh points near the borders of the domain. Also, for wave propagation problems, because the marching step in time is usually limited by the smallest grid size, having very fine mesh points near the boundary can significantly decrease the step size. This problem can be addressed by applying a mapping function.

In simulating acoustic radiation force induced shear wave propagation, a finer mesh density in the push locations can improve the accuracy of the simulation because that is where the most rapid changes take place. For more general cases, a finer mesh can be assigned to where the excitation is applied. To increase the mesh density in certain locations, a mapped Chebyshev method can be implemented to map the original Chebyshev space with a polynomial function, $$x = \frac{(as + s^{2p+1})}{(1+a)}; \quad (12)$$

where x defines the points after the mapping, and the parameters a and p are the parameters of the polynomial mapping. One advantage of this mapping function is that it decreases the grid density around the boundaries. Another advantage of this mapping function is that it increases the grid density near the center of the domain. Compared to other mapping functions, the polynomial mapping of Eqn. (12) has a lower spectral interpolation error.

Figure 2A:
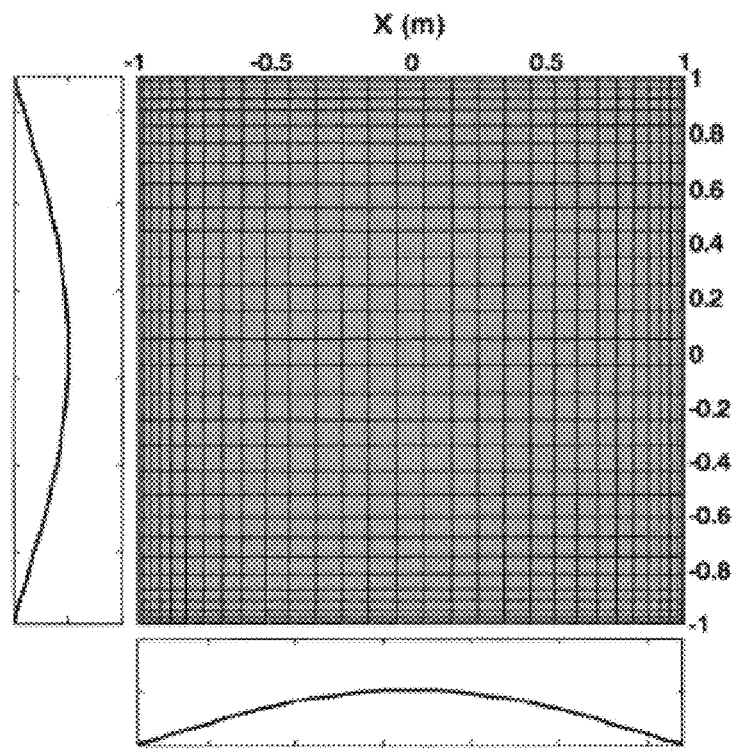
FIG. 2A shows an example of a mesh grid that can be used when computing spatial derivatives.
Figure 2B:
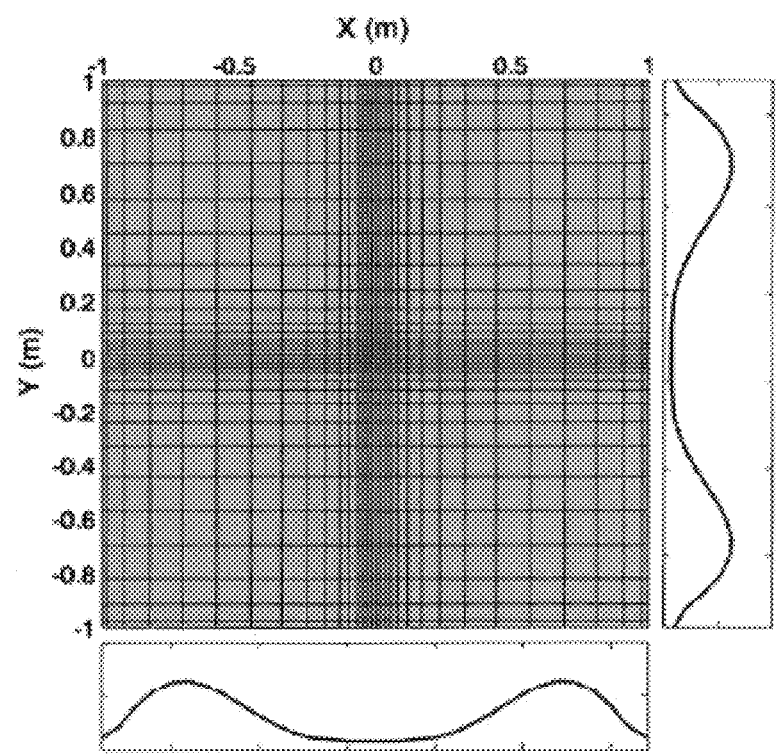
FIG. 2B shows an example the mesh grid of FIG. 2A remapped to increase the density of mesh grid points in central regions of the domain and to decrease the density of mesh grid points at the boundaries of the domain.

FIGS. 2A and 2B show an example of a mesh grid before (FIG. 2A) and after (FIG. 2B) mapping. The two plots around each figure are the grid spacing in x and y directions. The domains of both directions are [−1, +1] meters. The numbers of points in both directions are 32. The parameters of the polynomial mappings in both directions are a=0.2 and p=2.0. The mapping procedures increase the mesh size around the boundaries and decrease the mesh size around the center, as mentioned above.

Referring again to FIG. 1, boundary conditions are generated by the computer system, as indicated at step 108. As one example, to minimize the reflections from the boundaries, the domain boundaries can be configured to have a matching layer condition. In some implementations, the matching layer condition can be a so-called "perfectly matched layer" ("PML") condition or a convolutional PML ("CPML") condition.

For generating the boundary conditions based on a PML, an un-split formulation inside of the PML regions can be used, as described by R. Martin and D. Komatitsch in "An Unsplit Convolutional Perfectly Matched Layer Technique Improved at Grazing Incidence for the Viscoelastic Wave Equation," *Geophysical Journal International*, 2009; 179: 333-344, and by R. Martin, et al., in "A High-Order Time and Space Formulation of the Unsplit Perfectly Matched Layer for the Seismic Wave Equation Using Auxiliary Differential Equations (ADE-PML)," *Cmes-Computer Modeling in Engineering & Sciences*, 2010; 56:17-41. In this example, by denoting the spatial partial derivate of a function, F, with regard to the variable, x, as $\partial_x^F$, the following differential equation can be introduced, $$\frac{\partial p_x^F}{\partial t} = -d_x\left(\frac{\partial F}{\partial x} + p_x^{\gamma_x}\right); \quad (13)$$

where the parameter, $d_x$, is the spatial profile of the damping factor and $p_x^F$ is an auxiliary variable associated with the PML. This approach is not limited to the spatial dimension, x, but can be applied to any spatial dimensions (e.g., y and z).

The spatial profiles of the damping factors, $d_{x,y,z}$, can be polynomials. As one example, in the x-direction the damping factor can be, $$d_x = d_{max}\left|\frac{x - x_0}{X}\right|^\beta; \quad (14)$$

where $x_0$ and X are the starting point and thickness of the matching layer, respectively, and β is the exponent of the polynomial profile that describes how fast the damping factor ramps up within the matching layer.

As one example, Dirichlet boundary conditions can be applied to the boundary of the domain. Such a boundary will reflect the incident waves. With the presence of the matching layer (e.g., the PML layer), the wave energy is effectively diminished before getting back to the portion of the domain of interest.

The wave propagation is then simulated by the computer system, or viscoelastic wave propagation system, based on the selected viscoelastic properties, the initialized elastodynamic model, computed spatial derivatives, and generated boundary conditions, as indicated at step 110. In one example implementation, a hybrid explicit/implicit method can be implemented. In this implementation, the equations related to the viscous memory variables and PMLs can be solved by a Crank-Nicolson implicit integrator. Because the equations of the viscous memory variables and the PMLs are first order ordinary differential equations ("ODEs"), the implicit Crank-Nicolson integrator can also be adapted to be explicit with only marginally more computational complexity. The rest of the equations in the elastodynamic model can be solved with an explicit method with variable step size for efficiency.

The simulated wave data are then stored, as indicated at step 112. As one example, the simulated wave data can be stored in a memory or other data storage device. The simulated wave data can be used for various different applications. As one example, the simulated wave data can be used to design a tissue mimicking phantom for use with ultrasound or magnetic resonance elastography techniques, as indicated at step 114. As another example, the simulated wave data can be used to design an ultrasound probe, as indicated at step 116. Likewise, the simulated wave data can be used to design drivers for use in magnetic resonance elastography applications. In other examples, the simulated wave data can be used to design ultrasound or magnetic resonance elastography acquisition schemes, as indicated at step 118. For instance, the simulated wave data can be used to design optimal placement of ultrasound push pulses, and to design the ultrasound push pulses and their timing.

Figure 3:
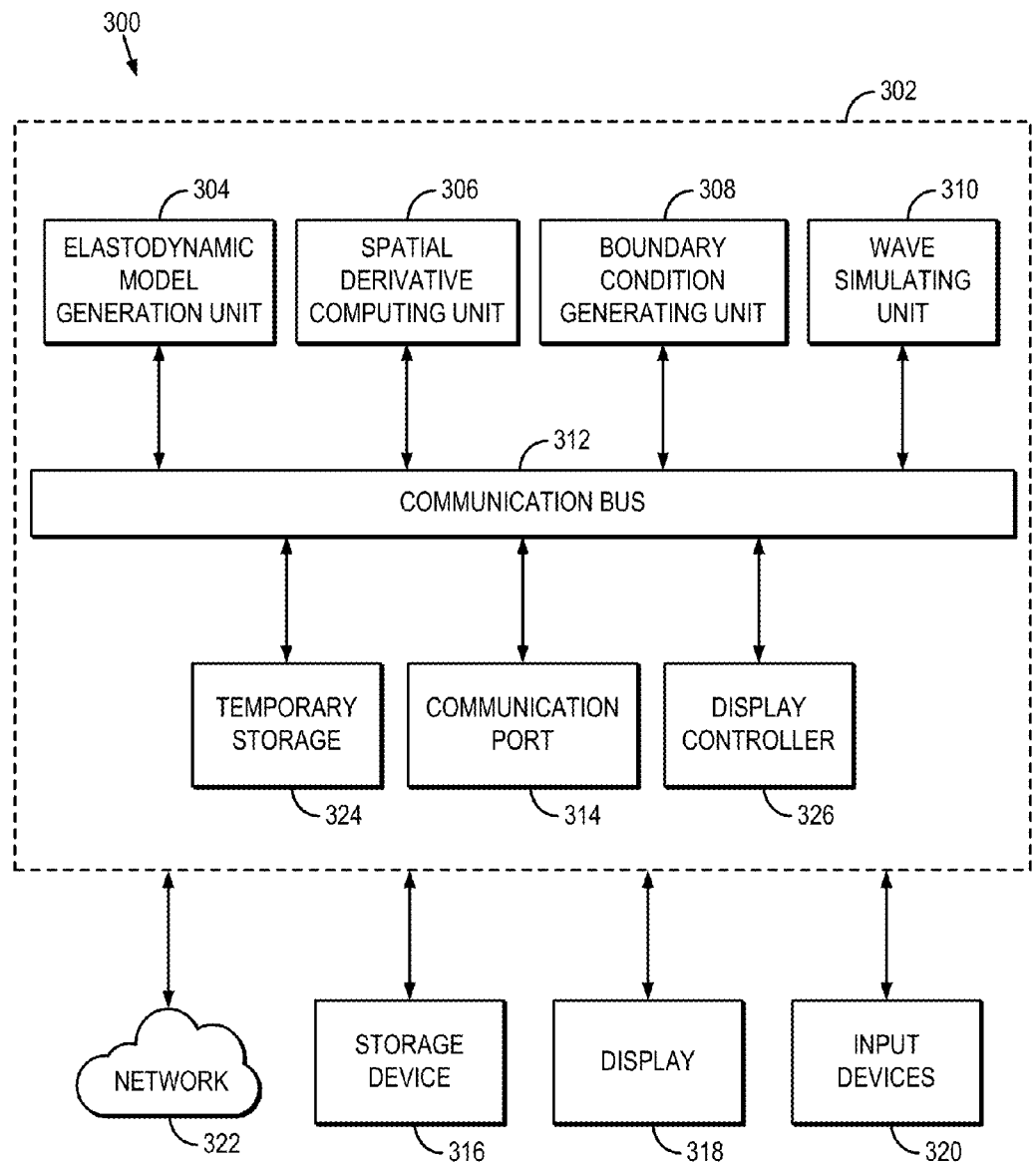
FIG. 3 is a block diagram of an example viscoelastic wave propagation simulation system that can implement the methods described here.

Referring now to FIG. 3, a block diagram of an example viscoelastic wave propagation system 300 that can be configured to implement the solver described here, is illustrated. Data can be provided to the viscoelastic wave propagation system 300 from a data storage device, and are received in a processing unit 302. As an example, the data received by the processing unit 302 can include viscoelastic properties (e.g., viscosity, strain relaxation time constant, stress relaxation time constant, stiffness tensor) for one or more media, and which are to be used in the wave simulation.

In some embodiments, the processing unit 302 can include one or more processors. As an example, the processing unit 302 may include one or more of an elastodynamic model generation unit 304, a spatial derivative computation unit 306, a boundary condition generation unit 308, and a wave simulating unit 310. In some examples, these units 304, 306, 308, 310 can be implemented as a single processor or as multiple different processors. The processing unit 302 can include one or more digital signal processors ("DSPs"), one or more microprocessor units ("MPUs"), or one or more graphics processing unit ("GPUs").

The elastodynamic model generation unit 304, spatial derivative computation unit 306, boundary condition generation unit 308, and wave simulating unit 310 can all be coupled to a communication bus 312. As an example, the communication bus 312 can be a group of wires, or a hardwire used for switching data between the peripherals or between any component in the processing unit 302.

The elastodynamic model generation unit 304 can be configured to select, generate, and otherwise initialize the elastodynamic model or models to be used when simulating waves in one or more viscoelastic media. As an example, the elastodynamic model generation unit 304 can generate and initialize Eqns. (1)-(10) described above.

The spatial derivative computation unit 306 can be configured to compute spatial derivatives to be used in one or more elastodynamic models when simulating waves in one or more viscoelastic media. As an example, the spatial derivative computation unit 306 can compute spatial derivatives using a modified Chebyshev pseudospectral method, such as the one described above. The spatial derivative computation unit can thus generate a mesh grid, remap the mesh grid according to a mapping function, and compute Fourier transforms.

The boundary condition generation unit 308 can be configured to select and generate boundary conditions for use when simulating wave propagation in one or more viscoelastic media. As an example, the boundary condition generation unit 308 can select the parameters for a matching layer (e.g., a PML, a CPML) and can generate boundary conditions based on that matching layer.

The wave simulating unit 310 can be configured to simulate wave propagation in one or more viscoelastic media based on one or more elastodynamic models generated and initialized by the elastodynamic model generation unit 304, based on the spatial derivatives computed by the spatial derivative computation unit 306, based on the boundary conditions generated by the boundary condition generation unit 308, and based on viscoelastic properties for one or more viscoelastic media. The wave simulating unit 310 can implement a hybrid explicit/implicit method for simulating wave propagation (e.g., based on a Crank-Nicolson implicit integrator).

The processing unit 302 can include a communication port 314 in electronic communication with other devices, which may include a storage device 316, a display 318, and one or more input devices 320. Examples of an input device 320 include, but are not limited to, a keyboard, a mouse, and a touch screen through which a user can provide an input. The display 318 can be used to display images and other information, such as wave simulation data produced by the wave simulation unit 310 (e.g., images that depict simulated waves propagating through one or more viscoelastic media).

In some implementations, the storage device 316 stores data, which may include viscoelastic properties (e.g., viscosity, strain relaxation time constant, stress relaxation time constant, stiffness tensor) for one or more viscoelastic media. The storage device 316 can also store wave propagation data simulated by the wave simulation unit 310. As one example, wave propagation data can include simulated wave displacements, velocities, and forces.

The processing unit 302 can also be in electronic communication with a network 322 to transmit and receive data and other information. The communication port 314 can also be coupled to the processing unit 302 through a switched central resource, for example the communication bus 312.

The processing unit 302 can also include a temporary storage 324 and a display controller 326. As an example, the temporary storage 324 can store temporary information. For instance, the temporary storage 324 can be a random access memory.

The present invention has been described in terms of one or more preferred embodiments, and it should be appreciated that many equivalents, alternatives, variations, and modifications, aside from those expressly stated, are possible and within the scope of the invention.

The invention claimed is:

1. A viscoelastic wave propagation simulation system, comprising:
   an input configured to receive viscoelastic property data for a viscoelastic medium;
   an elastodynamic model generation unit in communication with the input and configured to initialize an elastodynamic model for the viscoelastic medium based at least in part on the viscoelastic property data received by the input, wherein the initialized elastodynamic model includes memory variables for at least some of the viscoelastic property data;
   a spatial derivative computation unit in communication with the elastodynamic model generation unit and configured to compute spatial derivatives in the initialized elastodynamic model;
   a boundary condition generation unit in communication with the elastodynamic model generation unit and configured to generate boundary conditions for the initialized elastodynamic model;
   a wave simulation unit in communication with the elastodynamic model generation unit, the spatial derivative computation unit, and the boundary condition generation unit;
   wherein the wave simulation unit generates wave simulation data using a hybrid implicit and explicit method in which equations in the initialized elastodynamic model related to the memory variables and boundary conditions are integrated using an implicit method and other equations in the initialized elastodynamic model are integrated using an explicit method.

2. The viscoelastic wave propagation simulation system as recited in claim 1, wherein the elastodynamic model generation unit initializes the elastodynamic model based on a second order elastodynamic equation for the viscoelastic medium.

3. The viscoelastic wave propagation simulation system as recited in claim 2, wherein the elastodynamic model generation unit initializes the elastodynamic model using a velocity-stress formulation to decompose the second order elastodynamic equation for the viscoelastic medium into a system of partial differential equations of velocity and stress with respect to time.

4. The viscoelastic wave propagation simulation system as recited in claim 3, wherein the elastodynamic model generation unit initializes the elastodynamic model by generating partial differential equations for the memory variables with respect to time.

5. The viscoelastic wave propagation simulation system as recited in claim 1, wherein the spatial derivative computation unit computes the spatial derivatives based on a mesh grid that is selected over a domain in which wave propagation will be simulated by the wave simulation unit.

6. The viscoelastic wave propagation simulation system as recited in claim 5, wherein the spatial derivative computation unit generates a remapped mesh grid by remapping the mesh grid to decrease a density of grid points around a boundary of the domain and to increase a density of grid points at a selected region of the domain, and wherein the spatial derivatives are computed based on the remapped mesh grid.

7. The viscoelastic wave propagation simulation system as recited in claim 6, wherein the selected region of the domain is a center of the domain.

8. The viscoelastic wave propagation simulation system as recited in claim 6, wherein the selected region of the domain corresponds to a location at which an ultrasound push pulse will be applied to generate shear waves.

9. The viscoelastic wave propagation simulation system as recited in claim 6, wherein the spatial derivatives are computed based on a Fourier transform of the remapped mesh grid.

10. The viscoelastic wave propagation simulation system as recited in claim 1, wherein the spatial derivative computation unit computes the spatial derivatives using a Chebyshev spectral method.

11. The viscoelastic wave propagation simulation system as recited in claim 1, wherein the boundary condition generation unit generates the boundary conditions based on a matching layer.

12. The viscoelastic wave propagation simulation system as recited in claim 11, wherein the matching layer is a perfectly matched layer (PML).

13. The viscoelastic wave propagation simulation system as recited in claim 12, wherein the boundary condition generation unit generates the boundary conditions based on the PML using an unsplit formulation inside regions bounded by the PML.

14. The viscoelastic wave propagation simulation system as recited in claim 1, wherein the implicit method is a Crank-Nicolson implicit integrator.

15. The viscoelastic wave propagation simulation system as recited in claim 1, wherein the explicit method includes a predictor-corrector method.

16. The viscoelastic wave propagation simulation system as recited in claim 1, wherein the wave simulation unit generates the wave simulation data using an adaptive step size to march in time.

* * * * *

UNITED STATES PATENT AND TRADEMARK OFFICE
CERTIFICATE OF CORRECTION

PATENT NO. : 10,089,423 B2
APPLICATION NO. : 15/161440
DATED : October 2, 2018
INVENTOR(S) : Bo Qiang and Matthew W. Urban Page 1 of 1

It is certified that error appears in the above-identified patent and that said Letters Patent is hereby corrected as shown below:

In the Specification

Column 1, Line 24, "unitrasound" should be -- ultrasound --.

Signed and Sealed this
Tenth Day of September, 2019

Andrei Iancu
*Director of the United States Patent and Trademark Office*